Aug. 17, 1937.  C. G. REETZ  2,090,268

METHOD OF MAKING INTER-CELL CONNECTIONS FOR STORAGE BATTERIES

Filed April 29, 1935  2 Sheets-Sheet 1

Inventor
Carl G Reetz
By Stryker & Stryker
Attorneys

Aug. 17, 1937.  C. G. REETZ  2,090,268
METHOD OF MAKING INTER-CELL CONNECTIONS FOR STORAGE BATTERIES
Filed April 29, 1935  2 Sheets-Sheet 2
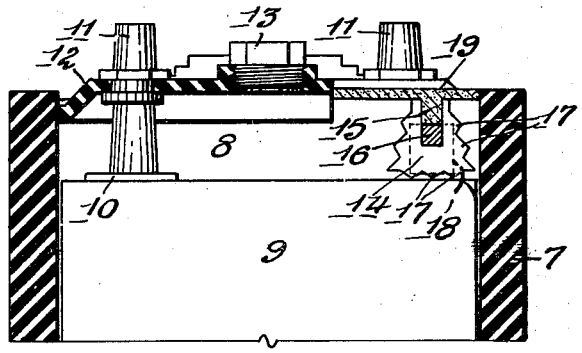
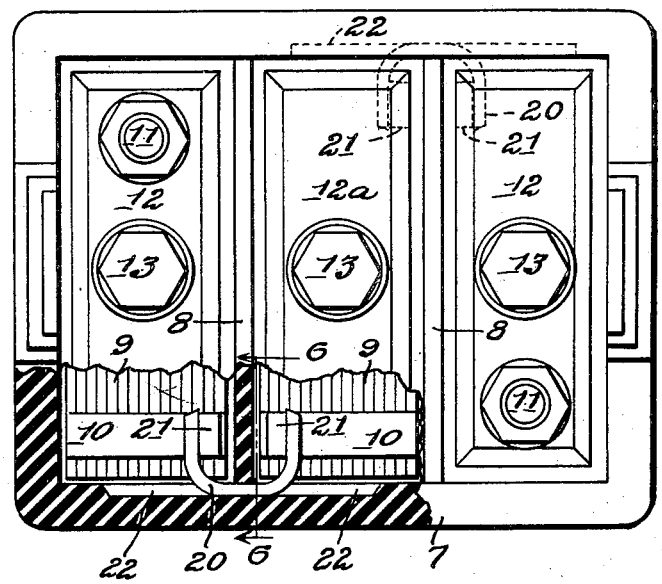
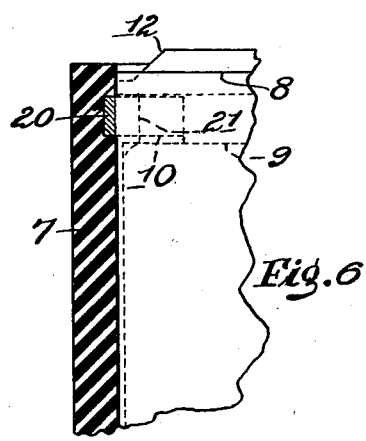
Inventor
Carl G Reetz
By Stryker & Stryker
Attorneys Patented Aug. 17, 1937

2,090,268

UNITED STATES PATENT OFFICE 2,090,268

METHOD OF MAKING INTER-CELL CONNECTIONS FOR STORAGE BATTERIES

Carl G. Reetz, St. Paul, Minn., assignor to National Battery Company, St. Paul, Minn., a corporation of Delaware Application April 29, 1935, Serial No. 18,705

1 Claim. (Cl. 136—134)

It is an object of this invention to provide novel inter-cell connectors for storage batteries whereby the appearance of the batteries is improved and certain economies are secured including a reduction in the quantity of lead required for the posts and connectors and elimination of joints between the covers and inter-cell connecting posts.

Heretofore it has been common in batteries having a plurality of cells to provide for each cell two large posts which project through the battery cover and have heavy external connections secured thereto. This construction usually involves sealing the connections between six or more posts and the covers and the exposed connectors and posts can only be given adequate mechanical strength by heavier construction than is required for conducting the charge of electricity.

By the present invention I shorten and otherwise reduce the weight of the inter-cell connections, including the posts, and at the same time eliminate all joints between such connections and the battery covers and afford an adequate seal to prevent spilling of the electrolyte from one cell into another.

Two forms of the invention are illustrated and described herein and in each of these forms an electric conductor or insert is molded into the battery container to insure a tight seal at the inter-cell partition.

The invention will be best understood by reference to the accompanying drawings in which:

Fig. 3 is a cross section taken on the line 3—3 of Fig. 1;

Fig. 4 is a part plan and part horizontal sectional view of a battery embodying an alternate form of the invention, the section being taken on a line similar to that of Fig. 1;

Fig. 5 is a fragmentary section taken horizontally through one of the inter-cell connectors of the alternate form, showing the position of the connector before it is bent in to connect with the cell units, and Fig. 6 is a fragmentary section taken on the line 6—6 of Fig. 4.

Figure 1:
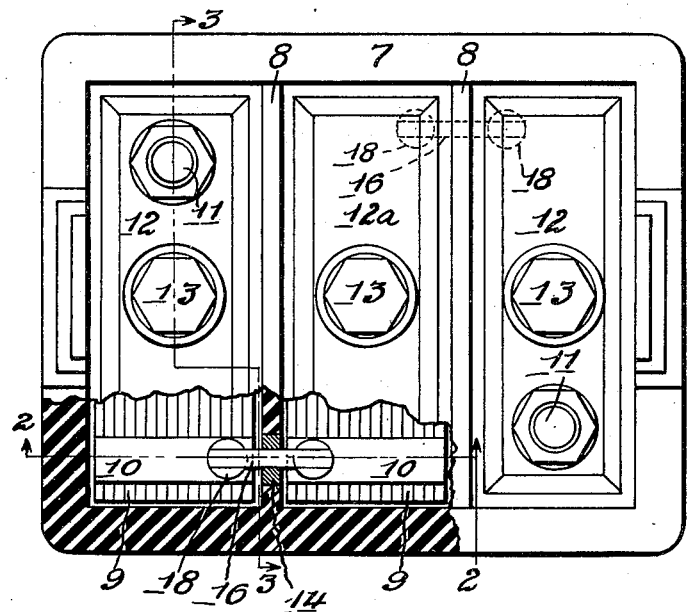
Figure 1 is a plan view of a battery embodying my invention and having a fragmentary portion shown in horizontal section, taken on the line 1—1 of Fig. 2.

In the drawings the numeral 7 indicates a battery container of the molded type divided into three cells by integral partitions 8. Cell units comprising the plates and separators are indicated generally by the numeral 9. Each of these units has a pair of cross straps 10 joining the plates of like polarity together at the top of the unit. The main terminal posts 11 project from the straps 10 of the end cells through cell covers 12. The middle cell has a cover 12—a without perforations for posts and the covers 12 and 12—a have the usual or suitable filling caps 13.

Figure 2:
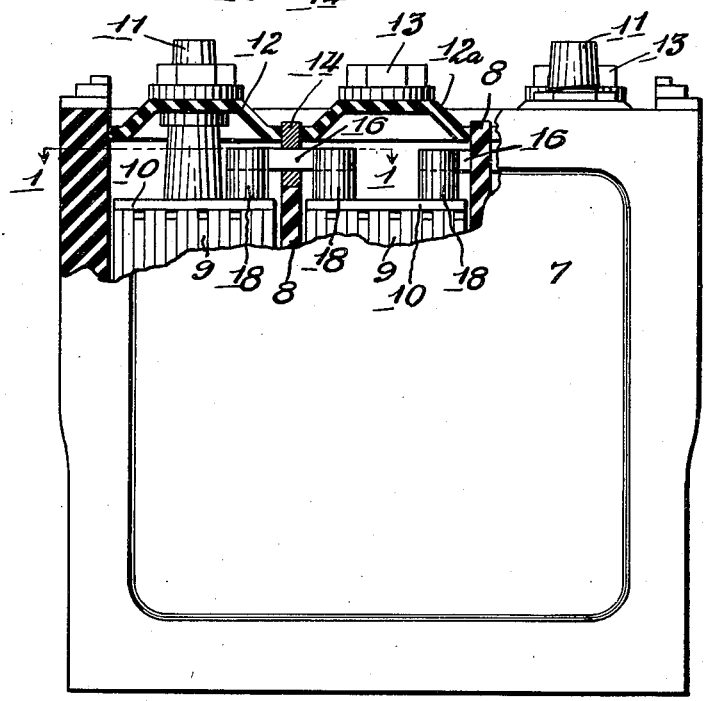
Fig. 2 is a part side elevation and part vertical section taken on the line 2—2 of Fig. 1.

In the form of the invention shown in Figs. 1, 2 and 3, a lead insert 14 is molded into each of the partitions 8 and has an upwardly open slot 15 to receive a short, inter-cell connector bar 16. The insert 14 preferably has the dovetail shape shown in Fig. 3 and toothed projections 17 on its edges to interlock with the composition of the container and form a leak-proof seal therewith. Integral with the straps 10 near their ends adjacent to the slots 15 are short posts 18. In assembling the battery, the units 9 are placed in the cells with the posts 18 for the inter-cell connections in alignment with the slots 15 in the inserts 14. The connector bars 16 are then inserted in the slots 15 and welded or burned onto the posts 18 and also onto the lead inserts 14 so that these bars become integral with the inserts 14. The slots 15 above the bar 14 may be filled in with lead or with the plastic compound 19, as indicated in Fig. 3, this same compound being employed to securely seal the covers 12 and 12—a as closures for the cells in the usual or suitable manner.

In the form of the invention shown in Figs. 4, 5 and 6, the arrangement of the covers 12 and 12—a, main terminals 11 and filling caps 13 is like that above described, but inter-cell connecting bars 20 are molded into the container walls at the ends of the partitions 8. During the molding of the container 7 for the alternate type of connectors, the bars 20 are supported in the mold in the straight or flat position and with their inner surfaces flush with the inner surfaces of the container walls, as indicated in Fig. 5. After inserting the units 9 in the cells, the ends of the bars 20 are bent inward to the U-shape indicated in Fig. 4, and the ends are then secured to posts 21 of the adjacent cells by welding or burning. It will be understood that the posts 21 are integral with the straps 10 connecting the plates of the adjacent cell units 9. Recesses 22 are left in the container walls when the ends of the bars 20 are bent to connect with the posts 21.

In both of the illustrated forms of the invention the inter-cell connectors, including the posts 18 and 21, are located beneath the covers 12 and 12—a so that covers of unusually simple construction may be employed. My improved inter-cell connectors are short and of unusually small cross section. An excess of material, such as is required when the inter-cell connectors are exposed on the exterior of the batteries, is thus eliminated. By molding the connector or the portion of it into the container, leak-proof connections between cells are facilitated and the escape of electrolyte from one cell into another is prevented.

Having described my invention, what I claim as new and desire to protect by Letters Patent is:

The method of making an intercell connection between cells of a storage battery having covered cells and cell units separated by a partition which comprises, molding a metallic insert into said partition and providing a transversely extending opening in said insert, installing said units in the cells separated by said partition, placing an intercell connecting bar in said opening and burning the ends of said bar to said units respectively and the central portion of said bar to said insert to thereby form a tight joint between said bar and partition.

CARL G. REETZ.